United States Patent
An et al.

(10) Patent No.: US 11,007,694 B2
(45) Date of Patent: May 18, 2021

(54) INTERIOR PARTS FOR VEHICLES AND METHOD OF MOLDING THE SAME

(71) Applicants: Hyundai Motor Company, Seoul (KR); Kia Motors Corporation, Seoul (KR)

(72) Inventors: Jae Hyun An, Seosan-si (KR); Seung Sik Han, Hwaseong-si (KR); Jong Heon Lee, Suwon-si (KR); Ik Jin Jung, Ansan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 277 days.

(21) Appl. No.: 15/595,539

(22) Filed: May 15, 2017

(65) Prior Publication Data

US 2018/0117812 A1    May 3, 2018

(30) Foreign Application Priority Data

Oct. 31, 2016    (KR) .......................... 10-2016-0143380

(51) Int. Cl.
*B29C 45/37*    (2006.01)
*B29C 45/00*    (2006.01)
(Continued)

(52) U.S. Cl.
CPC ........ *B29C 45/372* (2013.01); *B29C 33/3835* (2013.01); *B29C 45/0025* (2013.01);
(Continued)

(58) Field of Classification Search
CPC .............. B29C 45/372; B29C 33/3835; B29C 45/0025; B29C 45/1645; B29C 45/1704;
(Continued)

(56) References Cited

U.S. PATENT DOCUMENTS 3,784,830 A * 1/1974 Schwierz ................ H01J 29/38
250/214 VT
4,592,089 A * 5/1986 Hartman .......... G01N 27/44721
348/135

(Continued)

FOREIGN PATENT DOCUMENTS

CN        1642712 A       7/2005
CN        101034165 A     9/2007
(Continued)

*Primary Examiner* — Francisco W Tschen
*Assistant Examiner* — Guy F Mongelli
(74) *Attorney, Agent, or Firm* — Slater Matsil, LLP (57) ABSTRACT

A method of molding an interior part for a vehicle includes determining a 3D graphic sample model. A shape of the sample model has concave portions having curvatures determined through 3D modeling and gradients of an inner surface of each concave portion. A molded sample having the same general shape as the sample model is injection molded. Information related to scratch occurrence positions is acquired from the molded sample. Information of curvatures and gradients of the concave portions of the sample model are acquired and collected at positions on the sample model corresponding to the scratch occurrence positions. A limit angle and limit angle are determined by using the collected information and preset curvatures for the concave portion of a design of the interior part. The interior part having the concave portion with a shape based on the determined draft angle and the preset curvatures can then be injection molded.

17 Claims, 7 Drawing Sheets

(51) Int. Cl.
*B29C 33/38* (2006.01)
*B29C 45/16* (2006.01)
*B29C 45/17* (2006.01)
*B29L 31/30* (2006.01)
*B29C 33/44* (2006.01)

(52) U.S. Cl.
CPC ...... *B29C 45/1645* (2013.01); *B29C 45/1704* (2013.01); *B29C 33/44* (2013.01); *B29C 2045/0049* (2013.01); *B29C 2045/1682* (2013.01); *B29C 2045/1693* (2013.01); *B29C 2045/1728* (2013.01); *B29L 2031/3005* (2013.01)

(58) Field of Classification Search
CPC ............ B29C 33/44; B29C 2045/0049; B29C 2045/1682; B29C 2045/1692; B29C 2045/1728; B29L 2031/3005
USPC ........................................................ 264/255
See application file for complete search history.

(56) References Cited

U.S. PATENT DOCUMENTS

| | | | | |
|---|---|---|---|---|
| 4,708,778 | A * | 11/1987 | Zankl | C25D 7/04 205/118 |
| 4,905,422 | A * | 3/1990 | Panetti | E01B 31/17 451/347 |
| 5,812,402 | A * | 9/1998 | Nishiyama | G05B 19/4099 700/97 |
| 5,871,843 | A * | 2/1999 | Yoneda | C03C 17/007 427/165 |
| 5,928,600 | A * | 7/1999 | Chu | B29C 45/1704 264/572 |
| 6,335,095 | B1 * | 1/2002 | Sugimoto | B32B 25/00 428/402 |
| 6,695,036 | B2 * | 2/2004 | Brandl | B22C 7/02 164/122.1 |
| 6,941,016 | B1 * | 9/2005 | Wagman | G06K 9/4638 382/149 |
| 6,954,679 | B1 * | 10/2005 | Takeda | B21D 7/12 700/159 |
| 6,965,688 | B2 * | 11/2005 | Shimamura | G06T 17/10 382/154 |
| 7,115,858 | B1 * | 10/2006 | Holden | G01N 21/21 250/225 |
| 2002/0032552 | A1 * | 3/2002 | Nishiyama | B29C 33/3835 703/6 |
| 2002/0008232 | A1 | 6/2002 | Yu et al. | |
| 2002/0120920 | A1 * | 8/2002 | Jayaram | G06F 17/50 717/137 |
| 2003/0029692 | A1 * | 2/2003 | Rogner | B60K 23/02 192/85.51 |
| 2004/0241415 | A1 * | 12/2004 | Wadahara | B29C 70/226 428/298.1 |
| 2005/0116386 | A1 | 6/2005 | Hamano et al. | |
| 2005/0154481 | A1 * | 7/2005 | Berger | G06T 19/20 700/98 |
| 2006/0133620 | A1 * | 6/2006 | Lashkari | H04R 3/04 381/59 |
| 2006/0287817 | A1 * | 12/2006 | Nagel | B60W 30/09 701/507 |
| 2007/0060012 | A1 * | 3/2007 | Comfort | A63F 7/3622 446/168 |
| 2007/0148411 | A1 * | 6/2007 | Yamada | B29C 44/0461 428/172 |
| 2007/0242350 | A1 | 10/2007 | Endo | |
| 2007/0250197 | A1 * | 10/2007 | Glass | B44C 3/126 700/96 |
| 2008/0078473 | A1 * | 4/2008 | Huang | G01N 21/4738 144/392 |
| 2008/0246971 | A1 * | 10/2008 | Huang | G01N 21/47 356/446 |
| 2008/0305305 | A1 | 12/2008 | Sano et al. | |
| 2010/0003464 | A1 * | 1/2010 | Kitajima | B29C 33/44 428/172 |
| 2010/0054606 | A1 * | 3/2010 | Mishima | G06T 7/13 382/199 |
| 2010/0315419 | A1 * | 12/2010 | Baker | G06T 17/20 345/420 |
| 2011/0189440 | A1 * | 8/2011 | Appleby | B22C 9/04 428/156 |
| 2011/0287220 | A1 | 11/2011 | Ban et al. | |
| 2012/0062747 | A1 * | 3/2012 | Zeng | B60W 40/06 348/149 |
| 2013/0219344 | A1 * | 8/2013 | Zyracki | G06T 13/20 715/849 |
| 2014/0023211 | A1 * | 1/2014 | Inou | H04S 7/303 381/302 |
| 2014/0210951 | A1 * | 7/2014 | Cho | H04N 13/271 348/49 |
| 2014/0253722 | A1 * | 9/2014 | Smyth | G01P 3/38 348/135 |
| 2015/0251620 | A1 * | 9/2015 | Son | B29C 45/14467 280/728.3 |
| 2015/0258715 | A1 * | 9/2015 | Ohta | B29C 33/38 264/219 |
| 2016/0001714 | A1 * | 1/2016 | Migaki | B60R 13/0237 296/193.05 |
| 2016/0053062 | A1 * | 2/2016 | Maeda | C08L 33/12 428/220 |
| 2016/0131501 | A1 * | 5/2016 | Steigler | G06F 16/955 340/870.02 |
| 2016/0252346 | A1 * | 9/2016 | Bismuth | A41H 1/02 356/610 |

FOREIGN PATENT DOCUMENTS

| | | |
|---|---|---|
| CN | 101101372 A | 1/2008 |
| CN | 101318389 A | 12/2008 |
| CN | 102216120 A | 10/2011 |
| CN | 102466831 A | 5/2012 |
| GB | 2279287 A | 1/1995 |
| JP | H11105040 A | 4/1999 |
| JP | H11300756 A | 11/1999 |
| JP | 2012117005 A | 6/2012 |
| JP | 2014043047 A | 3/2014 |
| KR | 1020140059377 A | 5/2014 |
| KR | 1020150072558 A | 6/2015 |
| WO | 2010036801 A2 | 4/2010 |
| WO | 2014146789 A1 | 9/2014 |

* cited by examiner

INTERIOR PARTS FOR VEHICLES AND METHOD OF MOLDING THE SAME

CROSS-REFERENCE TO RELATED APPLICATIONS

This application claims under 35 U.S.C. § 119(a) the benefit of priority to Korean Patent Application No. 10-2016-0143380 filed on Oct. 31, 2016, the entire contents of which are incorporated herein by reference.

TECHNICAL FIELD

The present disclosure relates to an interior part for a vehicle and a method of molding the same.

BACKGROUND

A number of interior parts made of resin material, for example, crash pads, door trims, filler trims, headliners and the like are used in vehicles.

Since such vehicle interior parts are used as finishing materials that influence the external appearance of the interior of a vehicle, they must be manufactured so as to exhibit the external surface that can give a sense of high quality in an aesthetic sense or a tactile impression and they also must be manufactured with the consideration of functional aspects such as cushion performance and impact absorption performance if necessary.

As an example, in case of a crash pad mounted at the interior front of a cabin of a vehicle, the crash pad may be made in a structure in which a core of a skeletal structure, a foam layer for providing elastic cushion performance and shock absorption performance and a skin material for enhancing the external appearance are laminated such that it is aesthetically pleasing in its external appearance while it has elastic cushion performance and shock absorbing performance.

In recent years, with the development of materials and improvement of manufacturing process, a method of manufacturing an entire interior part such as a crash pad at once by injection molding without use of a separate skin material or application of a foam layer is applied.

In such interior parts, the molded surface becomes the surface of the product without additional surface treatment. There is known a non-painted crash pad formed with an embossed pattern, i.e., a raised relief pattern on the surface thereof to enhance the appearance quality and exhibit a sense of high quality.

In other words, the prior art as mentioned above is configured in such a manner that by forming a concavo-convex structure for transferring an embossed pattern on an inner surface of a mold for forming a molding cavity of a mold for molding the interior part, the embossed pattern can be formed on the surface of the interior part by means of the concavo-convex structure of the inner surface of the mold when a resin is injected into the molding cavity of the mold.

However, there is a problem that since an embossed pattern formed on the surface of the interior part such as a crash pad manufactured by means of an injection molding process has a fine height, the embossed pattern formed on the surface of the interior part is damaged, scratched, or the like in the process of opening the mold and taking out a product.

Figure 1:
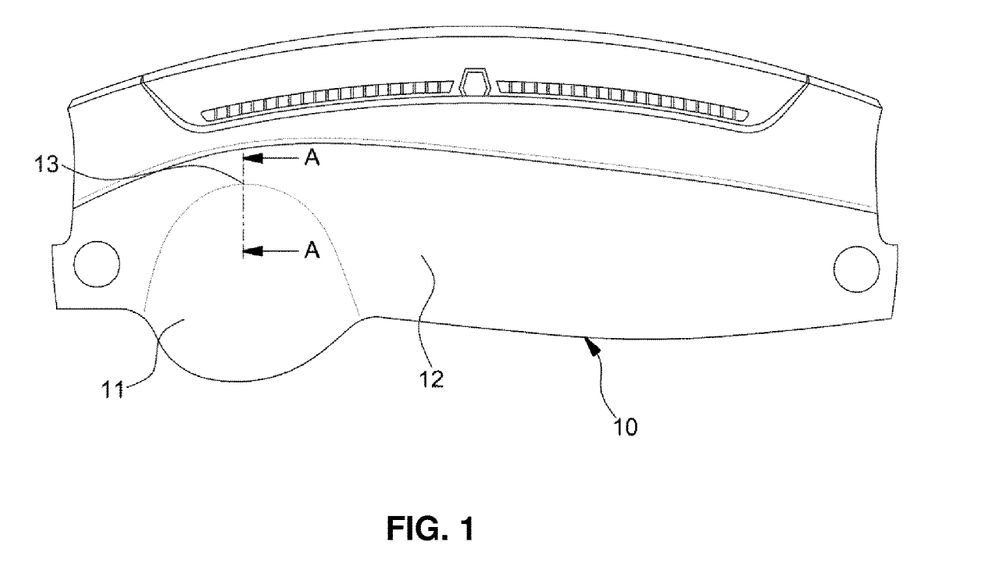
FIG. 1 is a view illustrating a crash pad having a convex portion and a concave portion.

Particularly, in a case where an interior part such as a crash pad is manufactured by means of a molding process such that it has portions of concave shape (hereinafter, referred to as "concave portion") on its one side as shown in FIG. 1, the surface portion of the concave portion on a product, that is, the surface portion on which an embossed pattern has been transferred may be scratched due to contact with the inner surface of the mold during movement of the mold in a preset direction in the process of opening the mold and taking out the product.

The above information disclosed in this Background section is only for enhancement of understanding of the background of the invention and therefore it may contain information that does not form the prior art that is already known in this country to a person of ordinary skill in the art.

SUMMARY

An interior part for a vehicle and a method of molding the same are disclosed. For example, the method of molding an interior part for a vehicle can prevent a phenomenon that an external surface formed with an embossed pattern is scratched due to contact with a mold moving to allow a product to be taken out after molding, by manufacturing the interior part through setting its shape to be optimized to prevent scratching by using information of a formula representing the relationship between curvatures and gradients of the concave portion where scratches may occur in manufacturing the interior part formed with the embossed pattern on its external surface by means of injection molding. The interior parts can be manufactured by the method.

The present disclosure relates to an interior part for a vehicle and a method of molding the same. Particular examples relate to a method of molding an interior part for a vehicle that can prevent a phenomenon that in manufacturing the vehicle interior part formed with an embossed pattern on its external surface by means of injection molding, the external surface formed with the embossed pattern is scratched due to contact with a mold moving to allow a product to be taken out after molding. Other examples relate to an interior part manufactured according to the method.

Embodiments of the present invention provide a method of molding an interior part that is capable of preventing a phenomenon that in manufacturing the interior part formed with an embossed pattern on the external surface thereof by injection molding, an external surface formed with the embossed pattern is scratched due to contact with a mold moving to allow a product to be taken out after molding.

In one aspect, the present invention provides a method of molding an interior part for a vehicle. A three dimensional (3D) graphic sample model is manufactured with a shape that has concave portions having curvatures determined respectively through 3D modeling on a program executed in a computer and gradients of an inner surface, each of which varies along a longitudinal direction. A sample having the same shape is injection molded as the manufactured sample model by way of trial on a basis of the manufactured sample model by means of a mold. Information of scratch occurrence positions due to contact with the mold moving during opening of the mold is acquired from the injection molded sample and information of curvatures of the concave portions and gradients of the inner surface of the concave portions at positions on the sample model corresponding to each of the scratch occurrence positions on the sample on the program is acquired and collected. A limit angle at which scratches occur on the concave portions of the interior part is determined by using the collected information of the curvatures and surface gradients of the concave portions and curvatures preset for the concave portions of the interior part to be molded. A draft angle is determined from the limit angle. The interior part having the concave portions with a shape to which the determined draft angle is injected molded and the preset curvatures are applied by means of the mold.

In another aspect, the present invention provides an interior part for a vehicle having concave portions with preset curvatures. The concave portions have a draft angle determined from a limit angle acquired through molding of a sample and when a sample having the same shape as a 3D-modeled sample model is injection molded in a mold on a basis of the 3D-modeled sample model made in a shape having concave portions by three dimensional (3D) modeling on a program executed in a computer. Information of scratch occurrence positions due to contact with the mold moving during opening of the mold is acquired from the injection molded sample, and then curvatures of the concave portions and gradients of an inner surface of the concave portions at positions on the sample model corresponding to each of the scratch occurrence positions on the sample are acquired on the program. The limit angle is determined as an angle at which scratches occur on the concave portions based on the information of the curvatures and surface gradients of the concave portion and the preset curvatures for the concave portions of the interior part.

Therefore, with the interior part for a vehicle and the method of molding the same according to the present invention, it is possible to prevent a phenomenon that when taking out the interior part after molding, the surface of the concave portions formed with an embossed pattern may be scratched due to contact with the mold and it is also possible to enhance quality of external appearance of the interior part greatly because a product is manufactured through setting an optimized shape of a product in order to prevent scratching by using information of formula representing the relationship between curvature and gradient of the concave portions where scratches may occur.

According to the molding method of the present invention, it is possible to manufacture a vehicle interior part having excellent quality of external appearance without any separate surface treatment and it is also possible to resolve defects such as scratches in the manufacturing process, so that defect rates can be lowered and manufacturing cost can be reduced.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF ILLUSTRATIVE EMBODIMENTS

Hereinafter, embodiments of the present invention will be described in detail with reference to the accompanying drawings so that those skilled in the art can easily carry out the present invention. However, the present invention is not limited to the embodiments described herein but may be implemented in other forms.

When a certain part is referred to as "comprising" a certain element, it does not mean that other elements are excluded but means that the part may further comprise other elements unless specifically stated otherwise.

The present invention is to provide a method of molding an interior part that is capable of preventing a phenomenon that an external surface formed with an embossed pattern is scratched due to contact with a mold moving to allow a product to be taken out after molding in association with manufacturing the interior part formed with the embossed pattern on the external surface thereof by injection molding.

The interior part in the present invention may be a crash pad manufactured by injection molding an entire product from a synthetic resin without using a separate skin material or applying a foam layer, or a non-painted crash pad manufactured by transferring the embossed pattern onto an external surface without any separate surface treatment during molding process using a mold.

Further, in the present invention, an interior part is manufactured in such a manner that it is formed with a portion having a concave shape (hereinafter, referred to as "concave portion") on one side thereof, wherein a surface of the concave portion (simply referred to as "concave external surface") is also formed with a raised relief pattern, i.e., embossed pattern.

The embossed pattern may be formed on the entire external surface of the interior part including the external concave surface, i.e., the entire surface that becomes an external portion of the interior part, or may be formed only on a part of the entire external surface of the interior part together with the external concave surface.

In this case, by forming a concavo-convex structure for transferring an embossed pattern on an inner surface of a mold for forming a molding cavity for molding the interior part, the embossed pattern can be formed on the surfaces of the concave portion and the interior part by means of the concavo-convex structure of the inner surface of the mold when a resin is injected into the molding cavity of the mold.

Further, in the present invention, the interior part is manufactured in such a manner that the concave portion is formed in a shape having a predetermined curvature R.

Referring to FIG. 1, an upward convex portion 11 is formed on one side of a crash pad 10 and the convex portion 11 and the remaining portion 12 of the crash pad are connected through a concave portion 13 having a concave shape.

In the present invention, as the upward convex portion 11 is formed on one side of the interior part 10, the concave portion 13 having a concave cross sectional shape exists between the convex portion 11 and the remaining portion 12 along the peripheral portion of the convex portion, wherein the concave portion 13 has the predetermined curvature R when viewed on the cross section.

Figure 2:
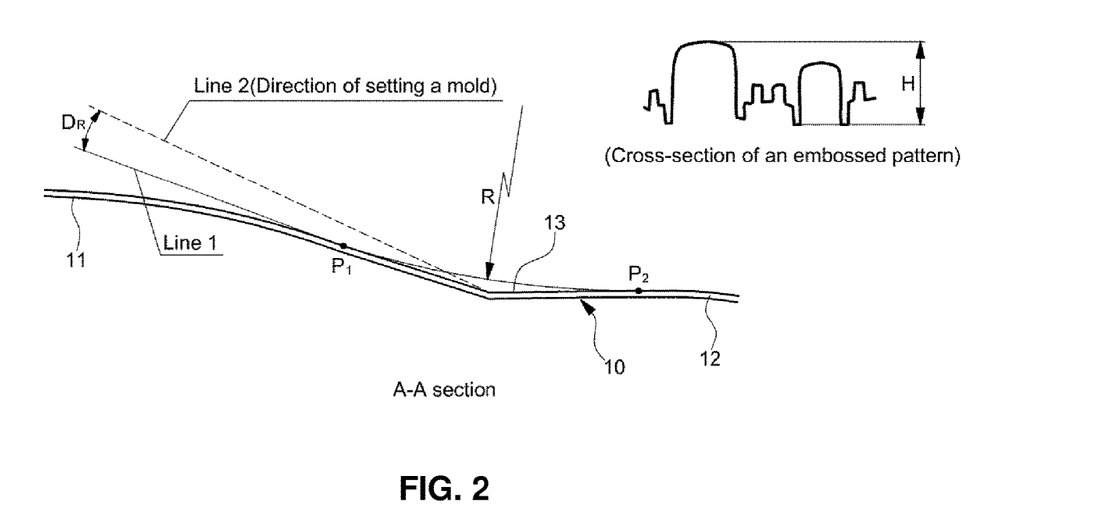
FIG. 2 is a cross-sectional view taken along line A-A in FIG. 1.

FIG. 2 showing a cross-sectional view taken along line A-A in FIG. 1 illustrates a concave portion 13 formed to have the predetermined curvature R as well as a portion rising upwards between the convex portion 11 and the concave portion itself and also illustrates an embossed shape (shown in the right side of the figure) formed on the external surface of the inner part 10.

In FIG. 2, H represents a height of the embossed portion and R represents a curvature acquired at the concave portion 13.

As illustrated in FIG. 2, the concave portion 13 has a cross sectional shape bent between the convex portion 11 and the remaining portion 12 of the interior part wherein the bent portion may have a shape curved gently or a shape bent at a boundary of a specific position as shown in the figure.

Figure 3:
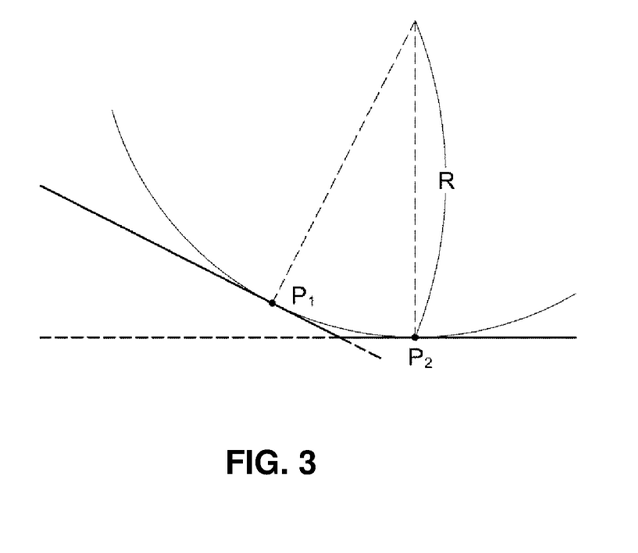
FIG. 3 is a view illustrating a curvature of a concave portion in the present invention.

Further, the curvature R of the concave portion 13 is defined as a radius (for example, in unit of mm) of a circle tangent to two points P1 and P2 on a surface (i.e., external surface) of the concave portion at the inside of the concave portion, as shown in FIG. 3.

This definition of the curvature R will be equally applied to a 3D graphic sample model as described later and a concave portion of a sample to be injection molded by way of trial.

In addition, an angle $D_R$ represents an angle between a tangential direction (see Line 1) and a moving direction of the mold (see Line 2) on the surface (i.e., external surface) of the concave portion, wherein the moving direction of the mold is a direction preset to move the mold so as to open the mold and take out a product from the mold after molding.

The direction in which the mold moves so as to take out the product from a molding apparatus is preset. In FIG. 2, the moving direction of the mold in the present invention is indicated by a straight line denoted by "Line 2 (direction of setting a mold)."

The term "taking out" means that the mold is moved to open the mold and the molded product (i.e., interior part) is separated from the mold.

Further, when the circle defining the curvature R of the concave portion 13 passes over one point P1 while being tangent to the point, $D_R$ can be defined as an angle between a tangent line (Line 1) at the point P1 on the surface of the concave portion where the circle passes over and a straight line (Line 2) representing the direction of setting a mold.

The angle $D_R$ must be set to be larger than an angle $D_L$ at which scratches on the surface of the concave portion 13 may occur, wherein the angle $D_L$ may mean the maximum value of $D_R$ values at which scratches on the interior part 10, particularly on the external surface of the concave portion of the molded interior part may occur when the mold is moved. In the present invention, a formula for obtaining the value of the angle $D_L$ is presented.

Further, when the angle $D_L$ is obtained from the formula as mentioned above, the shape of the interior part is designed by reflecting the angle $D_L$ and setting an angle $D_R$ to be applied to the concave portion 13 of an actual interior part to a value larger than the angle $D_L$ obtained from the above formula at the time of designing and molding the shape of the actual interior part 10, and then the interior part is manufactured by injection molding into a designed shape by means of a mold.

That is, the actual product of the interior part is manufactured by setting the angle $D_R$ at the concave portion 13 to be larger than the angle $D_L$.

Further, the angle $D_R$ at the concave portion 13 of the interior part 10 to be manufactured is an angle giving a suitable inclination to a portion rising upward of the concave portion, i.e., a kind of a draft angle, to easily remove the interior part from the mold and prevent scratches on the concave portion after molding. Hereinafter, the angle $D_R$ applied to an actual product of the interior part 10 will be referred to as a draft angle.

Further, the angle $D_L$ obtained from the formula in the present specification will be referred to as a limit angle. In the present invention, the limit angle $D_L$ is used to set the draft angle $D_R$ for the actual interior part 10 to be manufactured.

In order to prevent or alleviate the occurrence of scratches on the external surface (i.e., portion to which the embossed pattern is transferred) of the concave portion of the interior part manufactured by an injection molding process during taking out the product, it is required to increase the draft angle $D_R$ or the curvature R of the concave portion.

If the draft angle $D_R$ is increased, a phenomenon that the embossed pattern is one-sided by the mold is alleviated because a release angle is enlarged when the mold is moved to open the mold and take out the product, while if the curvature R is increased, stress concentration exerted to a surface of the mold during injection molding is alleviated and hence sticking of resin is alleviated.

Therefore, it is required to estimate and set the optimum draft angle $D_R$ and curvature R in determining the shape of the interior part including the concave portion. However, if the draft angle $D_R$ and curvature R are set depending only on the designer's experience, a lot of time, efforts and costs are required and deviation is also increased.

In order to solve the problems such as deviation as above and at the same time ensure quality of external appearance of a molded product, the present invention comprises a method for setting an optimized cross sectional shape of an interior part, and the method comprises a process for deriving a formula for obtaining the limit angle.

The molding method of the present invention will be described below in more detail.

Figure 4:
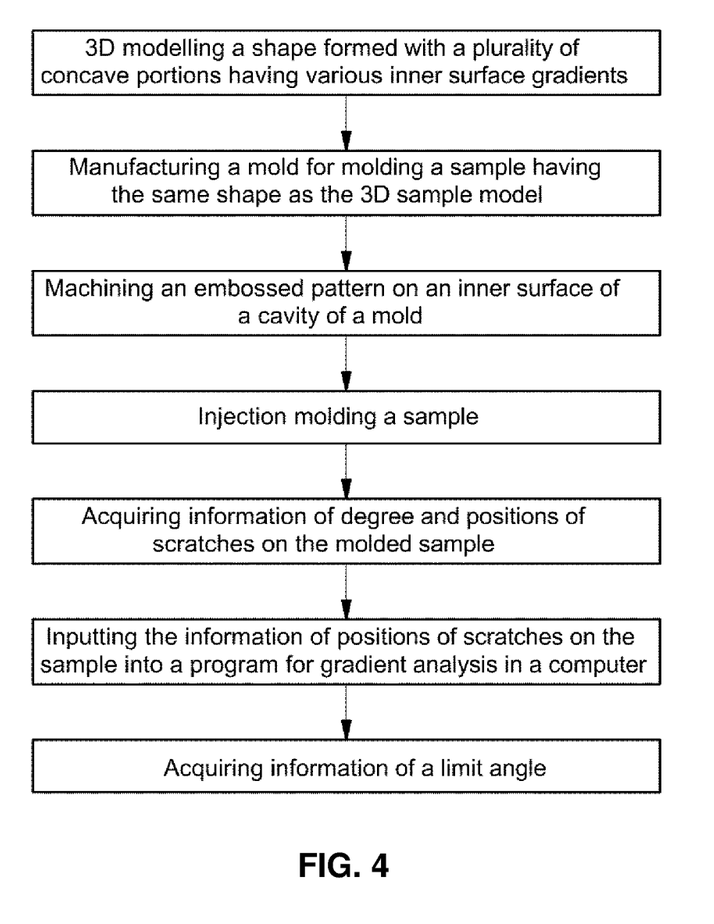
FIG. 4 is a block diagram showing a molding method according to the present invention.

FIG. 4 is a block diagram showing the molding method according to the present invention.

First, a 3D graphic sample model, which is described on a drawing in a shape having a plurality of concave portions formed to be elongated in a direction parallel to a top surface through 3D modeling using a program to be executed on a computer, is manufactured.

Figure 5:
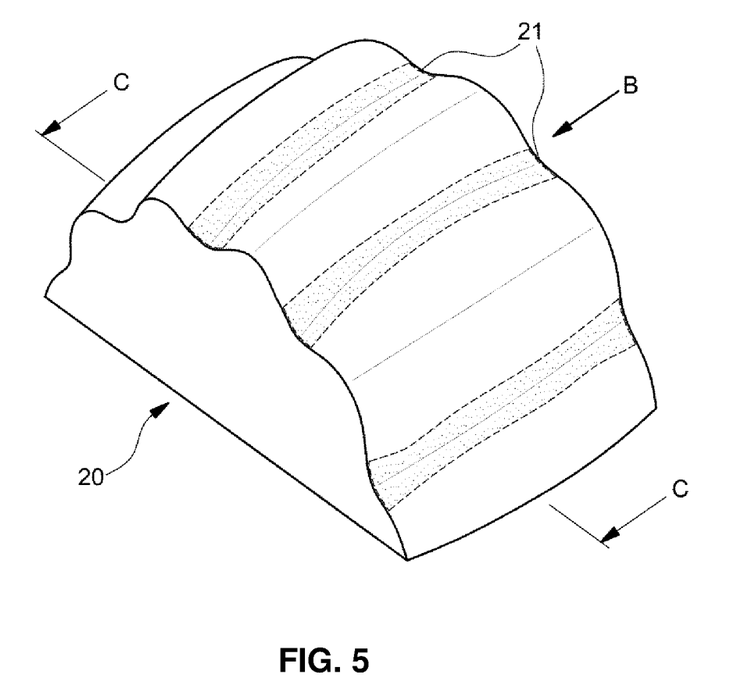
FIG. 5 is a view illustrating an example of a sample model set through a 3D modeling program in the present invention.

FIG. 5 shows an example of a sample model set on a 3D modeling program. As shown in this figure, in the 3D sample model 20, the shape of the sample is described on a drawing on the program wherein each of the concave portions 21 has a predetermined curvature R.

In this case, each of the concave portions 21 may be set to have a different curvature and each of the curvatures of the concave portions is set to increase by a certain value determined stepwise for each concave portion, so that a difference of the curvature by the certain value between the concave portions exhibits.

Figure 6:
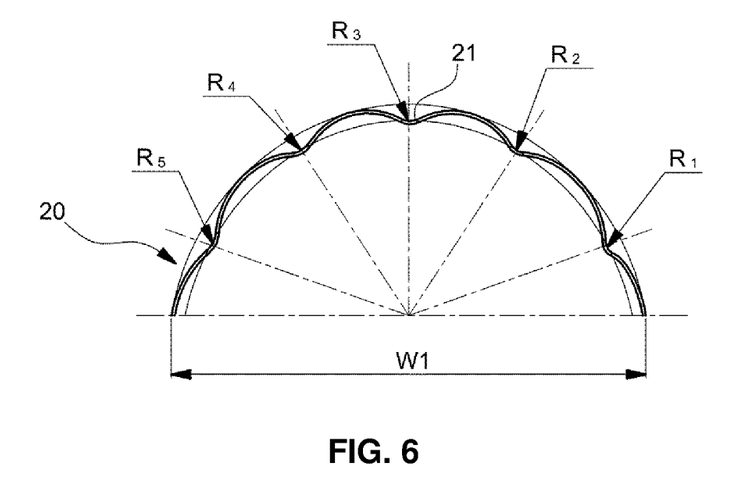
FIG. 6 is a view illustrating the shape of a 3D sample model according to the present invention.

For example, FIG. 6 illustrates the shape of the 3D sample model (which is the same as the cross-sectional shape of a sample to be described later) wherein the shape of FIG. 6 may be a shape seen in a direction of arrow B in FIG. 5, or a cross sectional shape taken along line C-C. Hereinafter, description will be made with reference to the cross-sectional shape.

As shown in the drawing, a plurality of concave portions 21 of which the curvatures are different by the certain value may be set along a circumferential direction on the cross section of the 3D sample model 20.

Further, a known commercial program 'CATIA V5' capable of 3D modeling in various shapes can be used as a program used for modeling the sample model 20.

Referring to FIG. 6, the 3D graphic sample model 20 has a generally semicircular shape in cross section. The figure shows an example that a plurality of concave portions 21 having different curvatures R1 to R5 are arranged and set along the circumferential direction of the semicircle on the top surface of the semicircular shape in a cross section.

Further, the concave portions 21 of the sample model 20 are formed in such a manner that gradient of each of the inner surfaces thereof varies depending on positions in the longitudinal direction. In this case, the gradient of each of the inner surfaces varies depending on positions in the longitudinal direction of the concave portions 21.

As an example, the sample model 20 may be manufactured in such a manner that a section of the entire length along the longitudinal direction of each concave portion 21 is divided into sections having a predetermined length, for example, a predetermined constant length and that gradients of the top surfaces of the sections may be different from each other.

Figure 7:
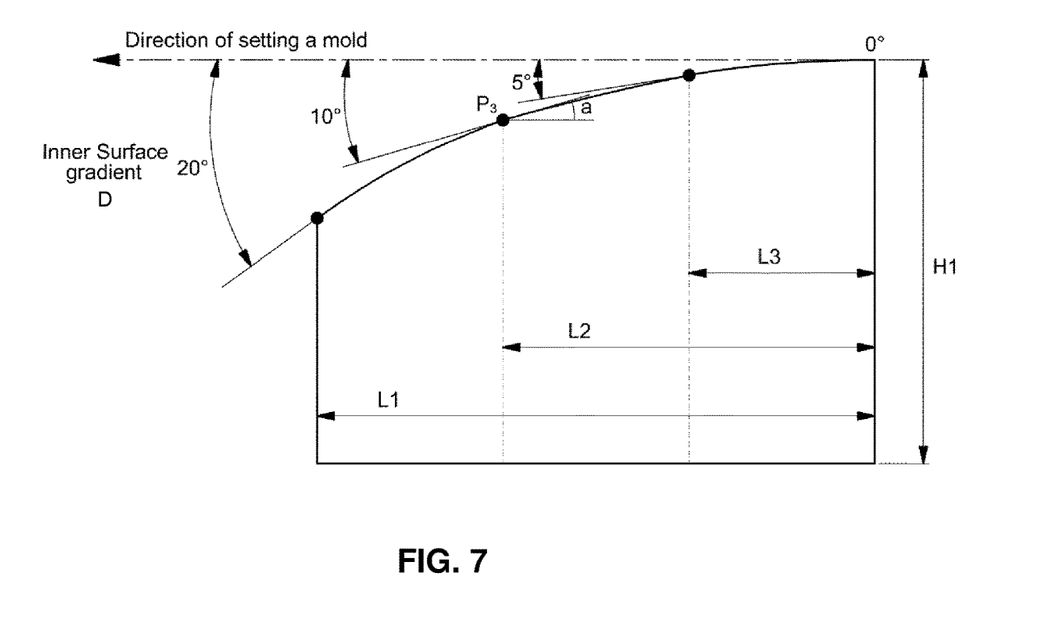
FIG. 7 is a cross-sectional view showing an example of a sample model of which a top surface along a concave portion is modeled by using equations of curves in accordance with the present invention.

FIG. 7 shows the shape of a sample model sectioned along the concave portion (which is the same as the shape of a molded sample to be described below). The cross-sectional shape of FIG. 7 may be a shape sectioned along the central position of the inside of the concave portion.

In the present invention, a sample model is manufactured through 3D modeling work, a sample having the same shape as the 3D sample model is injection molded by way of trial on a basis of the 3D sample model as will be described later, and data necessary to determine the draft angle for the actual product is collected from the sample injection molded by way of trial.

In molding the sample model and then molding the sample as described above, various values of the curvature and surface gradient of the concave portions in the sample model and the sample are preferably set to comprise, in the range thereof, values of the curvature and gradient of the concave portions that are likely to be applied to the actual product.

Next, a mold for injection molding a sample having the same shape as the sample model 20 shown in FIGS. 5 and 6 is manufactured, by using the sample model and then an actual sample having the same shape as the sample model is injection molded from a resin by means of a mold.

In this case, the moving direction of the mold for opening the mold to take out the sample after molding the sample may be set in a horizontal direction.

Further, when molding the sample, the top surface of the sample including the surfaces of the concave portions is formed with an embossed pattern which is the same as that applied to the surface of the product (i.e., interior part) to be actually manufactured.

That is, the same embossed pattern as that on the actual product is transferred onto the surface of the sample by using a mold as in molding the actual product. To this end, a plurality of embossed portions are machined on the inner surface of the cavity (i.e., surface of the cavity of the mold for molding the surface of the sample) which is the molding space in the mold.

Then, after the sample is injection molded and taken out from the mold as described above, the occurrence of scratches on each concave portion of the molded sample is examined. At this time, the degree of scratches and a position where each scratch occurs are examined for each of the concave portions.

The position where the scratches have occurred in each concave portion can be examined in such a manner that the actual sample is sectioned along each concave portion so as to obtain a sectional shape as shown in FIG. 7 and then the length of a direction x axis (i.e., abscissa axis in the drawing) of a position where the scratches have occurred is measured.

That is, the length (distance) from the right end of the cross section in FIG. 7 as a start point to the position where the scratches have occurred in the direction of the x axis in the concave portion of the sample sectioned is directly measured.

After information about the position where the scratches have occurred is acquired for each concave portion as mentioned above, the acquired information about the scratch occurrence position in the sample is input to the 3D modeling program, and then a position in the sample model, which is the same as the information about the scratch occurrence position in the molded sample, i.e., information of a surface gradient at each scratch occurrence position in the sample model is acquired on the program.

At this time, when using a computer program having a function of gradient analysis for surfaces of the model, for example 'CATIA', information of surface gradient at each scratch occurrence position in the sample model can be acquired by using a 'Draft Analysis' function.

In this case, the information of the surface gradient at the position where scratches have occurred is obtained from the sample model, but this corresponds to the degree of the surface gradient at the scratch occurrence position in the actual sample having the same size and shape as the sample model.

Further, the surface gradient D at the scratch occurrence position is obtained for each concave portion having the predetermined curvature R and as a result, information of the curvature R of the concave portion in which scratches have occurred and information of the surface gradient D at the scratch occurrence position can be obtained at every scratch occurrence position.

After acquiring the information of the curvature and surface gradient at the scratch occurrence position as described above, a formula representing the relationship between the curvature R and the surface gradient D of the concave portion where scratches may occur is derived based on the acquired information.

The formula as mentioned above can be obtained by a linear equation, that is, a first-order equation as described later. In particular, when the curvature of the concave portion is fixed in designing the shape of the actual interior part, this formula can be provided as a formula for obtaining the limit angle $D_L$ as mentioned above from the curvature.

As a result, when manufacturing the actual interior part, the draft angle $D_R$ of the concave portion is determined to be larger than the predetermined limit angle $D_L$ and the shape of the interior part is determined depending on the determined draft angle.

The formula as mentioned above is an equation representing the relationship between the curvature R and the surface gradient D of the concave portion where scratches may occur as described above. It can be obtained and used as a first-order equation in which the curvature R (which corresponds to the concave curvature in the actual product to be molded) and the surface gradient D (which corresponds to the limit angle) are taken as variables and a R correlation representing the relationship between the curvature R and the surface gradient D which are obtained at every position in the sample model corresponding to the scratch occurrence position in the sample is taken as a coefficient.

Figure 8:
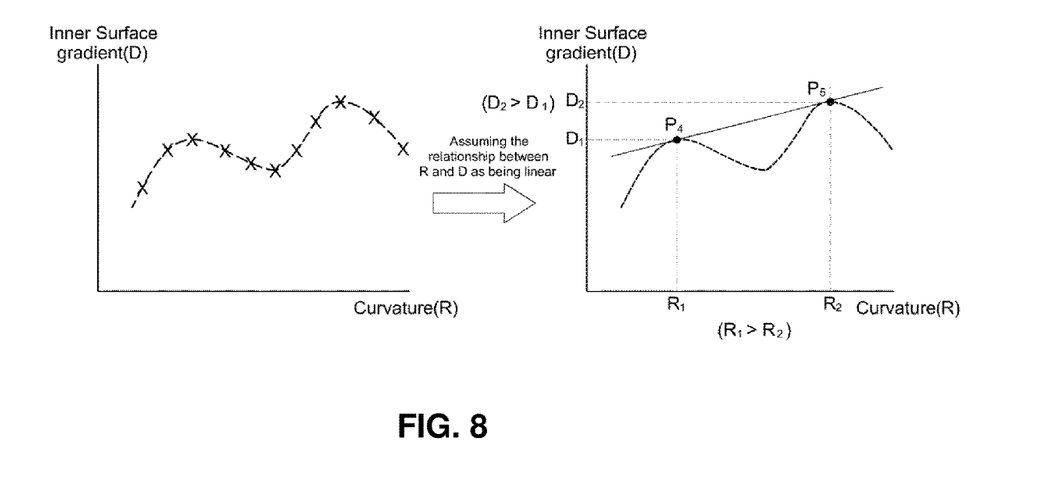
FIG. 8 is diagrams illustrating that values of curvature R and surface gradient D at points where scratch occurs are indicated in a coordinate plane in accordance with the present invention.

More specifically, the curvature R of the concave portion where the scratches have occurred and the surface gradient D at the position where the scratches have occurred can be obtained for each scratch occurrence position. As shown in FIG. 8, values of the curvature and the surface gradient at each scratch occurrence position are indicated on the Cartesian coordinate system with the abscissa represented by the curvature R and the ordinate represented by the surface gradient D in order to determine the R correlation.

Referring to FIG. 8, a line chart can be drawn by each point taking the curvature R and the surface gradient D at the scratch occurrence position as coordinate values wherein this line chart is drawn as a curve having a plurality of peak points P4 and P5.

For example, the curve may have two peak points P4 and P5. If values of the curvature and surface gradient at the peak points P4 and P5 are ($R_1$, $D_1$) and ($R_2$, $D_2$) (where $R_1 > R_2$, $D_2 > D_1$) respectively, the R correlation is obtained through assuming the relationship between the curvature R and the surface gradient D as being linear.

That is, the R correlation can be obtained by a slope of a straight line connecting the two peak points P4 and P5, more specifically by an absolute value of the slope of the straight line connecting the two peak points P4 and P5.

More specifically, the slope of the straight line connecting the two peak points P4 and P5 is $(D_2-D_1)/(R_2-R_1)$. If the R correlation is determined by the absolute value, the equation representing the relationship between the curvature R and the surface gradient D of the concave portion can be obtained by the following equation.

$$D = \left| \frac{D_2 - D_1}{R_2 - R_1} \right| R \quad \text{Equation 1}$$

The value of the surface gradient D obtained from the equation (1) is used as the limit angle $D_L$, R is the curvature of the concave portion used in designing the shape of the actual interior part, and $D_1$, $D_2$ and $R_1$, $R_2$ are curvature values and surface gradient values at scratch occurrence positions respectively, which are obtained at the time of test injection of the sample and are curvature values and surface gradient values at the two peak points P4, P5 on the line chart of FIG. 8.

Consequently, when the curvature R of the concave portion of the interior part is determined, the draft angle $D_R$ of the concave portion can be selected to be larger than the limit angle $D_L$ obtained from the equation 1 and then used in manufacturing the actual interior part.

FIG. 8 shows an example in which a curved line chart having two peak points P4 and P5 is obtained. However, the curved line chart (curvature vs surface gradient) indicating data obtained through test injection molding of the sample, i.e., curvatures R and surface gradients D at scratch occurrence positions in the sample on the coordinates may have more than two peak points.

In this case, there may be a plurality of straight lines connecting two peak points out of a plurality of peak points wherein after determining slope values for all of the plurality of straight lines, the largest value among absolute values of the slope values is determined as the R correlation value.

Once the limit angle DL is obtained from the equation 1 as described above, the shape of the interior part having the concave portion to which the draft angle greater than the limit angle is applied is designed and then the interior part is injection molded according to the designed shape by means of the mold.

In a case where the interior part is injection molded by applying the draft angle as mentioned above, the occurrence of scratches on the concave portion as in the conventional case can be prevented. The inventor of the present invention injection molded non-painted crash pads having a concave portion repeatedly by way of trial in line with the molding method proposed in the present invention and confirmed whether or not scratches occurred. As a result, it was confirmed that no scratch occurred when the interior part is injection molded by applying various curvatures and also applying the draft angle larger than the limit angle obtained from the equation 1 at the time of applying each of the curvatures.

As described above, the method of molding an interior part for a vehicle according to the present invention comprises steps of: manufacturing a three dimensional (3D) graphic sample model through 3D modeling on a program executed in a computer; injection molding a sample having the same shape as the manufactured sample model by way of trial on a basis of the manufactured sample model; acquiring from the injection molded sample information of scratch occurrence positions in the sample due to contact with the mold, and acquiring and collecting information of curvatures and surface gradients at each of the scratch occurrence positions from the information of scratch occurrence positions in the sample; determining a limit angle according to the application of preset curvatures to a concave portion of the interior part to be molded on a basis of the collected information of curvatures and surface gradients at each of the scratch occurrence positions, and determining a draft angle which is at least larger than the limit angle; and injection molding the interior part having the concave portion with a shape to which the draft angle and the preset curvatures are applied.

By the method of molding an interior part for a vehicle according to the present invention, it is possible to prevent a phenomenon that when taking out the interior part after molding, the surface of the concave portions formed with the embossed pattern may be scratched due to contact with the mold and it is also possible to enhance quality of external appearance of the interior part greatly.

On the other hand, as for a non-painted interior part such as a non-painted crash pad, there arises a problem about the appearance quality in that if there is no surface treatment after injection molding, defects such as gas marks, weld lines, fine scratches and the like generated by an injection molding process exist.

Although such an appearance quality problem may be concealed when the specular reflectance is increased by increasing gloss of appearance of the molded article and hence defect is concealed by the specularly reflected light, it is difficult to increase a gloss level because of low quality in the aesthetic sense due to high gloss.

Figure 9:
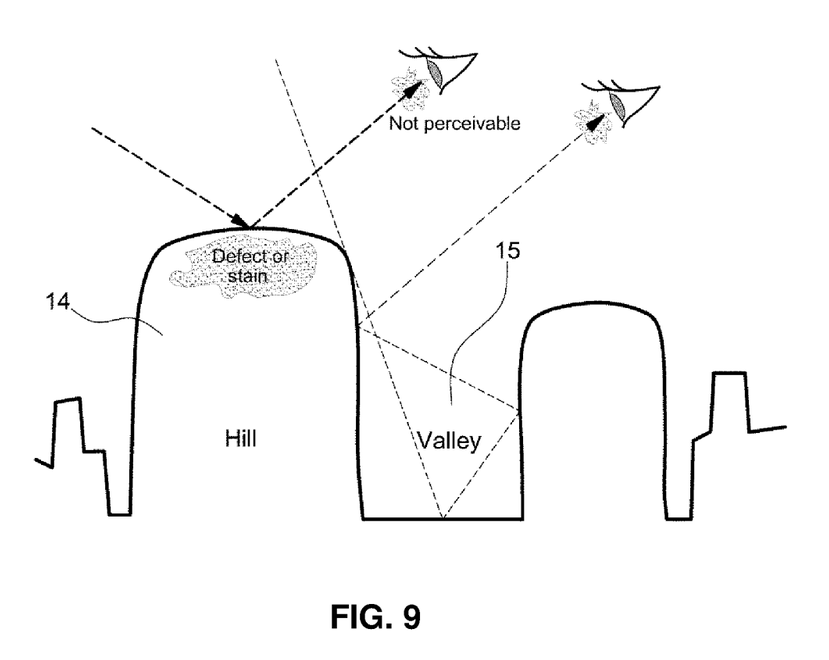
FIG. 9 is a view illustrating the sectional shape of an embossed pattern on the surface of a molded product.

Description is now made with reference to FIG. 9 showing a sectional shape of the embossed pattern. When a protruding portion 14 is referred to as a hill portion and a recessed portion 15 as a valley portion in the sectional shape of the embossed pattern of the product, the embossed surface of the product has hill portions 14 and valley portions 15.

In this case, if there is a defect such as a stain on the hill portions 14 out of the surface of the product, when gloss of the hill portions 14 is high, the specularly reflected light from the surface is too bright and thus it is erased in eyes, with the result that it is impossible for a person to recognize the stain with the naked eye.

On the other hand, the reflected light from the valley portions 15 has a relatively low reflectance due to the light trap effect represented by a pocket shape of the valley portion so that it is possible to visually feel or recognize gloss or color.

However, if gloss of the surface of the product is unconditionally increased in order to conceal surface defect, there arises a problem that the surface of the product gives a sense of low quality in the aesthetic sense because of its high gloss.

Accordingly, in order to solve the problems as above, the method of molding an interior part according to the present invention comprises a method of partially adjusting a gloss level on a surface of a product to conceal a surface defect.

Figure 10:
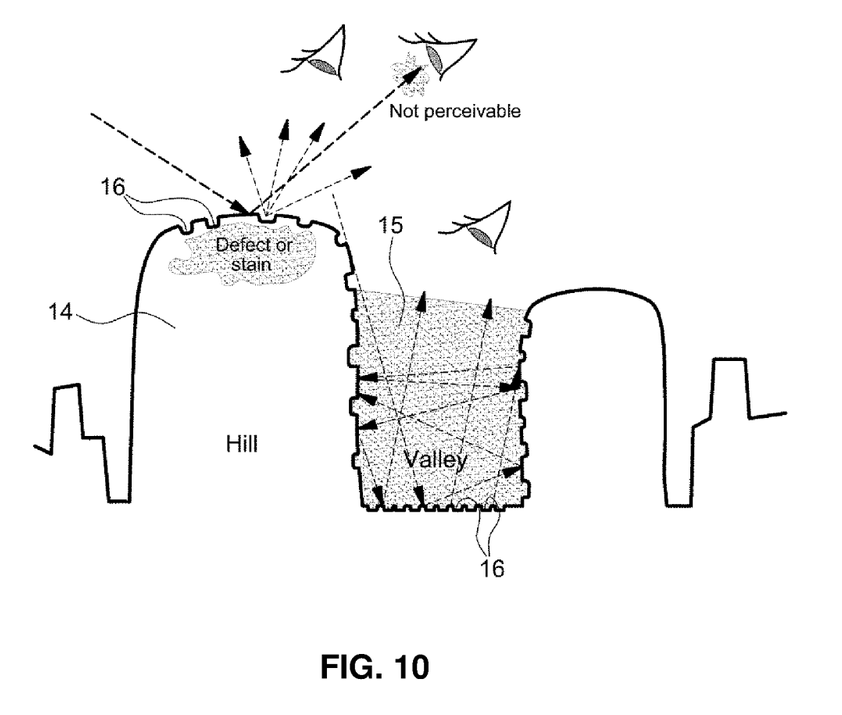
FIG. 10 is a cross sectional view showing surface of a molded product on which an embossed pattern is formed and of which the gloss is controlled in accordance with the present invention.

FIG. 10 is a cross section view showing a surface of a molded product on which an embossed pattern is formed and in which gloss is controlled in accordance with the present invention. As shown in the drawing, a microporous pattern is formed on the hill portion 14 and the valley portion 15 in order to reduce the gloss level.

This microporous pattern on the surface of the product may be a pattern formed by forming a plurality of micropores 16 on a top surface of the hill portion 14 and inner surfaces of the valley portion 15 of the embossed surface of the product.

As described above, in the present invention, the micropores 16 are formed on the hill portion 14 and the valley portion 15 to increase diffuse reflection and thereby a gloss level on the surface of the product is lowered as a whole by the micropores (i.e., low gloss surface is provided on a product), while the micropores 16 are partially formed on the hill portion 14 in the shape of an undefined pattern such that diffuse reflection is increased and a gloss level is reduced due to the micropores and that a local gloss level on portions where no micropore is formed is increased due to the specularly reflected light.

In particular, according to the present invention, a plurality of micropores 16 are formed on the top surface of the hill portion 14 and the bottom surface of the valley portion 15 to lower the gloss level and achieve a low gloss level and furthermore, the micropores 16 can be formed on inner side walls of the valley portion 15 (these walls correspond to sides of the hill portion) as shown in FIG. 10.

In this case, the reflection area, i.e., the area of the remaining portion (portion on which no micropore is formed) excluding the portion where the micropores 16 are formed is increased compared to that on the valley portion 15 by making density of the micropores 16 on the top surface of the hill portion 14 lower than that on the bottom surface of the valley portion 15, so that the specular reflectance is increased and thereby the gloss level is increased as compared with that of the valley portion 15.

Accordingly, surface defects or stains existing on the top surface of the hill portion 14 can be concealed to an extent that they are not visible to the naked eye due to the relatively high gloss level on the top surface.

The stains may be defects of the product itself occurring during injection molding, i.e., defects such as gas marks, weld lines, fine scratches, etc. held by the surface of the product, or contaminants attached to the surface of the product during use.

As described above, according to the present invention, the micropores 16 are formed on the top surface of the hill portion 14 at a relatively lower density than that on the bottom surface of the valley portion 15 wherein the micropores 16 are only formed locally on the top surface such that a portion having a relatively high gloss level due to specular reflection exists on the top surface.

Therefore, the entire top surface of the hill portion 14 exhibits different gloss locally, not the same gloss and the gloss level on the surface where no micropore is formed is locally increased so that defects and stains can be concealed.

In other words, there are intended portions having gloss level increased on the top surface of the hill portion 14 by not forming micropores 16 locally on the top surface for concealment of surface defects or stains. The micropores 16 formed only on specific portions increase the diffuse reflectance and hence reduce the visible gloss level, whereas the area of the surface on which the micropores 16 are not formed (i.e., area of reflective portions) is increased as compared with that on the valley portion 15 and thereby the specular reflectance is increased, so that it is possible to conceal defects or stains.

Further, in order to realize a low gloss product surface that can give a sense of high quality while concealing defects or stains on the product surface, the micropores 16 are also formed on the inner side walls and the bottom surface of the valley portion 15.

By forming the micropores 16 on the inner side walls of the valley portion 15 as mentioned above, the diffuse reflectance on the valley portion 15 having shape and structure of the pocket is increased by the micropores 16 on the side walls and the micropores 16 on the bottom surface, so that the optical trapping phenomenon is strengthened by the pocket structure and thereby the visual gloss level is reduced.

Further, density of the micropores 16 on the lowermost bottom surface of the valley portion 15 is relatively increased to increase the diffuse reflectance (scattered reflectance) and the visual gloss level is decreased by virtue of the optical trapping phenomenon by the pocket shape and structure.

In this way, according to the present invention, a microporous pattern, i.e., a plurality of micropores 16 is formed on the surface on which the embossed pattern is formed, specifically on the hill portion 14 and the valley portion 15 in order to realize low gloss, wherein it is intended that there is an area where the gloss level is locally increased, not the same gloss level, on the top surface of the hill portion 14. For this purpose, the density of the micropores 16 on the hill portion is lowered compared to that on the valley portion 15 and thereby the micropores 16 are formed only partially on the hill portion, so that the hill portion exhibits a relatively high gloss compared to the valley portion 15 and thereby defects or stains existing on the surface are concealed so as to make it difficult to recognize with the naked eye.

Since the micropores 16 are formed locally on the top surface of the hill portion 14 as described above, a diffuse reflection portion on which the micropores 16 are formed can be clearly distinguished from a specular reflection portion of the remaining surface on which the micropores 16 are not formed.

Therefore, since the portion where the micropores 16 are not formed on the top surface of the hill portion 14 (this portion becomes a specular reflection portion) exists, there is an effect of increasing the area of reflection, a specular diffusivity and a gloss level compared to the valley portion 15.

Further, the portion where the micropores 16 are formed on the top surface of the hill portion 14 increases a scattered reflectance, which contributes to reducing a gloss level perceived visually (with the naked eye) and makes it possible to realize a low gloss surface.

Further, the micropores 16 formed at a relatively high density on the valley portion 15 increases the scattered reflectance and at the same time increases a diffuse reflectance greatly, thereby reducing the gloss level perceived visually (with the naked eye).

Consequently, this makes it possible to not only conceal the appearance quality problem such as defects and stains but also realize the low gloss of the molded product.

In the present invention, the micropores 16 on the surface of the product can be formed by a microprojection pattern formed on a surface of the cavity of the mold wherein the mold is manufactured such that it is formed with a concavo-convex structure pattern for forming an embossed pattern as described above and a microprojection pattern for molding micropores on the surface of the cavity, and then it is used in molding.

Since the mold having a transfer layer for transferring an embossed pattern on a surface of a product to be injection molded and micropores on the embossed surface (surfaces of hill and valley portions) is known in the field of art, a detailed description related to manufacture of a mold capable of transferring the embossed pattern and micropores is omitted.

For example, there is known a method of manufacturing a mold in which a specific pattern for transferring an embossed pattern on a surface of a mold (i.e., cavity surface) is etched and then a micropore pattern for transferring micropores is again etched on the etched mold surface with the aid of photolithography.

Further, there is known a method of forming the pattern as mentioned above by stacking a separate film on the mold surface to form a pattern and attaching a masking film onto the separate film and then performing an etching process for removing only the portion selected by the masking film.

Although embodiments of the present invention are described in detail as above, it is apparent that the scope of the present invention is not limited to the embodiments described in detail and many variations and modifications made to the present invention by those skilled in the art using basic idea of the present invention as defined in the appended patent claims fall within the scope of the invention.

What is claimed is:
1. A method of molding an interior part for a vehicle, the method comprising:
   determining a three dimensional (3D) graphic sample model, a shape of the sample model having concave portions having different curvatures determined through 3D modeling on a program executed in a computer and gradients of an inner surface of each concave portion, the gradients varying along a longitudinal direction of each of the concave portions;
   injection molding a molded sample having a shape based on the sample model;
   acquiring, from the molded sample, information related to scratch occurrence positions due to contact with a mold used in injection molding the molded sample;
   acquiring and collecting information of curvatures of the concave portions of the sample model and gradients of an inner surface of each concave portion of the sample model at positions on the sample model corresponding to the scratch occurrence positions;
   determining, on the three dimensional (3D) graphic sample model, limit angles at which scratches occur on concave portions of the interior part to be injection molded by using the acquired and collected information and preset curvatures for the concave portions of the interior part, wherein a curvature of the concave portions of the interior part is a radius of a circle tangent to two points on a surface of the concave portions of the interior part inside the scratched concave portion of the molded sample;
   determining draft angles from the limit angles, wherein the draft angles are angles between a tangent line at one point to which a circle is tangent on the three dimensional (3D) graphic sample model and a straight line representing a moving direction of the mold, the moving direction of the mold being set to allow the mold to be opened after injection molding of the interior part,
   wherein an equation (1) representing a relationship between the curvature R and the surface gradient D of the concave portion of the three dimensional (3D) graphic sample model is obtained as:

$$D = \left| \frac{D_2 - D_1}{R_2 - R_1} \right| R$$

wherein, a value of a surface gradient D obtained from the equation (1) is used as the limit angles, R is a preset curvature of a concave portion used in designing a shape of the interior part, and $D_1$, $D_2$ and $R_1$, $R_2$ are surface gradient values and curvature values at the scratch occurrence positions respectively, which are obtained at the time of test injection of the molded sample, and are surface gradient values and curvature values at two peak points on a line chart of the scratches occurred on the concave portions of the molded sample; and injection molding the interior part having the concave portion with a shape based on the determined draft angles and the preset curvatures, the injection molding being performed with $$D = \left| \frac{D_2 - D_1}{R_2 - R_1} \right| R.$$

the mold modified based upon the acquired and collected information.

2. The method of claim 1, wherein a concavo-convex structure is disposed on an inner surface a molding cavity of the mold used when injection molding the interior part, wherein an embossed pattern is molded on an external surface of the interior part by the concavo-convex structure disposed on the inner surface of a molding cavity of the mold, the external surface including a surface of the concave portion of the interior part, the embossed pattern including the concavo-convex structure.

3. The method of claim 2, wherein micropores for reducing a gloss level are formed on surfaces of hill portions and valley portions of the embossed pattern of the external surface, wherein the hill portions are protruding portions on the embossed pattern of the external surface and the valley portions are recessed portions on an embossed surface of the external surface.

4. The method of claim 3, wherein a density of the micropores on a surface of the hill portions is lower than a density of the micropores on a surface of the valley portions.

5. The method of claim 2, wherein a concavo-convex structure is disposed on an inner surface of a molding cavity in the mold used in injection molding the molded sample so that an embossed pattern which is the same as the embossed pattern formed on the external surface of the interior part is molded on a surface of a concave portion of the molded sample.

6. The method of claim 1, wherein injection molding the interior part comprises injection molding a crash pad.

7. The method of claim 6, wherein the crash pad comprises:
an embossed pattern on an external surface of the interior part having the concave portion formed by injection molding, the external surface including a surface of the concave portion of the crash pad, the embossed pattern including a concavo-convex structure; and
micropores for reducing a gloss level are formed on surfaces of hill portions and valley portions of the embossed pattern of the external surface, wherein the hill portions are protruding portions on the embossed pattern of the external surface and the valley portions are recessed portions on an embossed surface of the external surface, and wherein a density of the micropores on a surface of the hill portions is lower than a density of the micropores on a surface of the valley portions.

8. The method of claim 7, wherein the micropores are formed at predetermined scratch occurrence positions.

9. The method of claim 7, wherein the injection-molded interior part and the embossed pattern have a shape to prevent scratching.

10. The method of claim 7, wherein the concave portion of the crash pad has the preset curvatures;
wherein the concave portion of the crash pad has a draft angle determined from a limit angle acquired through molding of a sample; and
wherein when a sample having the same shape as a 3D-modeled sample model is injection molded in a mold on a basis of the 3D-modeled sample model made in a shape having the concave portions of the sample model by three dimensional (3D) modeling on a program executed in a computer, and then information of scratch occurrence positions due to contact with the mold moving during opening of the mold is acquired from the injection molded sample, and then information of curvatures of the concave portions of the sample model and gradients of an inner surface of the concave portions of the sample model at positions on the sample model corresponding to each of the scratch occurrence positions on the sample are acquired on the program, and then the limit angle is determined as an angle at which scratches occur on the concave portion of the crash pad based on the information of the curvatures of the concave portions of the sample model and the gradients of the inner surface of the concave portions of the sample model and the preset curvatures for the concave portion of the crash pad.

11. The method of claim 10, wherein an embossed pattern is formed on a surface of the sample including a surface of a concave portion of the molded sample by a concave-convex structure of the inner surface of a molding cavity of the mold used in the injection molding of the molded sample having the shape based on the sample model.

12. The method of claim 10, wherein a curvature of the concave portion of the crash pad is a radius of a circle tangent to two points on a surface of the concave portion of the crash pad inside the concave portion; and
wherein the draft angle is an angle between a tangent line at one point to which the circle is tangent and a straight line representing a moving direction of the mold, the moving direction of the mold being set to allow the mold to be opened after molding.

13. The method of claim 10, wherein the draft angles of the concave portions of the crash pad has a value larger than the limit angles.

14. The method of claim 1, wherein the draft angles are determined as an angle selected in values larger than the limit angle.

15. The method of claim 1, wherein the 3D graphic sample model includes a plurality of concave portions formed to be elongated in a direction parallel to each other on a top surface of the 3D graphic sample model and wherein the molded sample includes a plurality of concave portions formed to be elongated in a direction parallel to each other on a top surface of the molded sample.

16. The method of claim 15, wherein both the 3D graphic sample model and the molded sample have a semicircular shape viewed in a cross section, wherein a plurality of concave portions are arranged on a top surface of the cross-sectional semicircular shape along a circumferential direction of a semicircle of the semicircular shape.

17. The method of claim 1, wherein the concave portions of the 3D graphic sample model and the molded sample have the same curvatures but varied in the location on the interior part.

* * * * *